United States Patent [19]

Jeffery

[11] 3,810,671
[45] May 14, 1974

[54] JETTISON DEVICE FOR HELICOPTER LOAD CARRYING SYSTEM

[75] Inventor: Philip Auriol Edgar Jeffery, Trumbull, Conn.

[73] Assignee: United Aircraft Corporation, East Hartford, Conn.

[22] Filed: Aug. 30, 1972

[21] Appl. No.: 284,827

[52] U.S. Cl. ........... 294/83 AE, 89/1.5 F, 294/83 R
[51] Int. Cl. .............................................. B64d 1/12
[58] Field of Search ........... 294/83 R, 83 A, 83 AA, 294/83 AB, 83 AE, 90; 89/1.5 R, 1.5 F, 1.5 B

[56] References Cited
UNITED STATES PATENTS

| | | |
|---|---|---|
| 3,032,365 | 5/1962 | Campbell ......................... 294/83 A |
| 2,924,147 | 2/1960 | Bohl et al ...................... 294/83 E X |
| 3,074,320 | 1/1963 | Trifonoff ........................... 294/83 X |
| 2,852,982 | 9/1958 | Musser ........................ 294/83 AE X |
| 2,959,443 | 11/1960 | Welch .............................. 294/83 R |
| 3,009,730 | 11/1961 | Gantschnigg et al. ............ 294/83 R |
| 3,081,122 | 3/1963 | Jungersen ............................ 294/83 |

Primary Examiner—Evon C. Blunk
Assistant Examiner—Johnny D. Cherry
Attorney, Agent, or Firm—Russell M. Lipes, Jr.

[57] ABSTRACT

A jettison device for the load carrying system of a helicopter which comprises an explosively operated mechanism for both jettisoning the load held by a hook at the end of a pendant and simultaneously cutting the hook retrieval cable.

6 Claims, 5 Drawing Figures

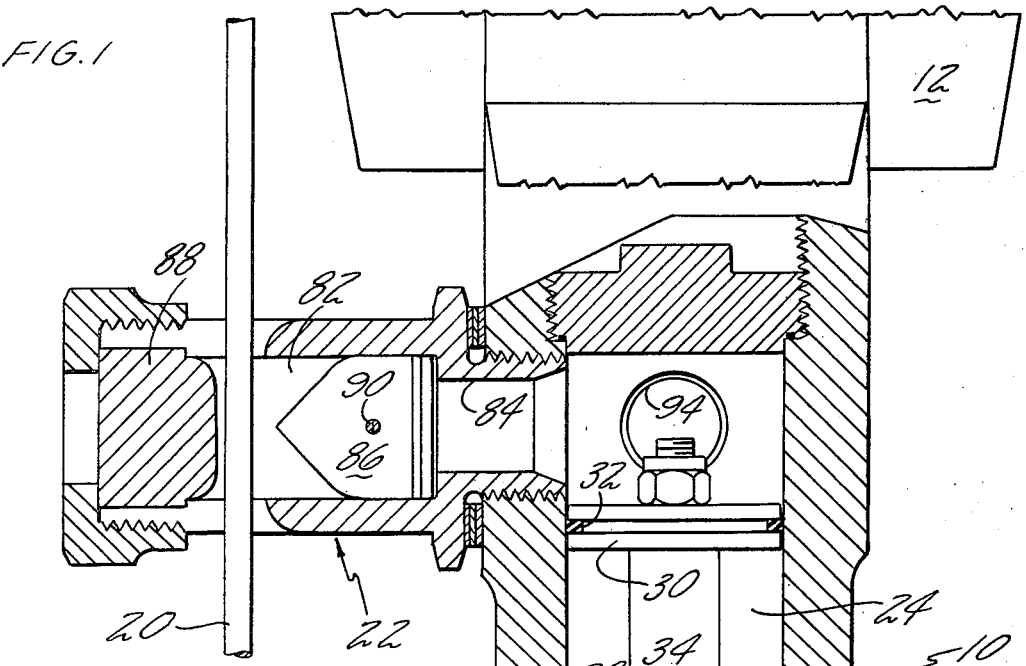
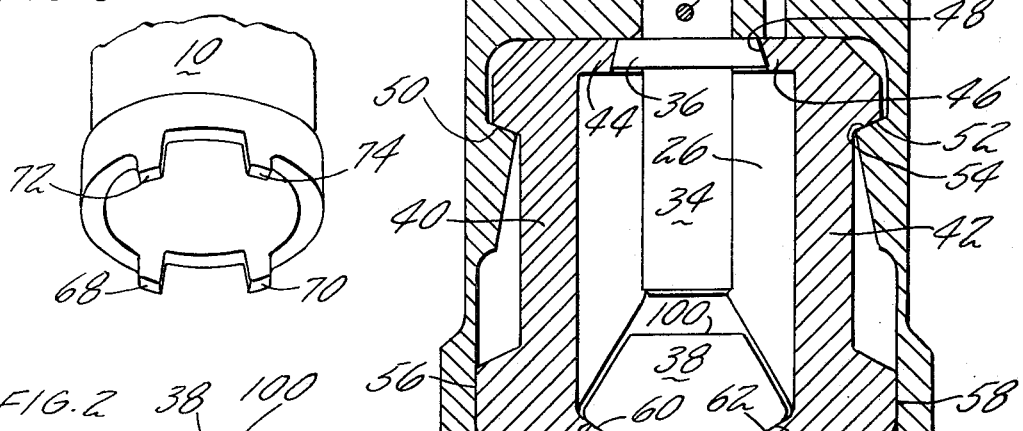
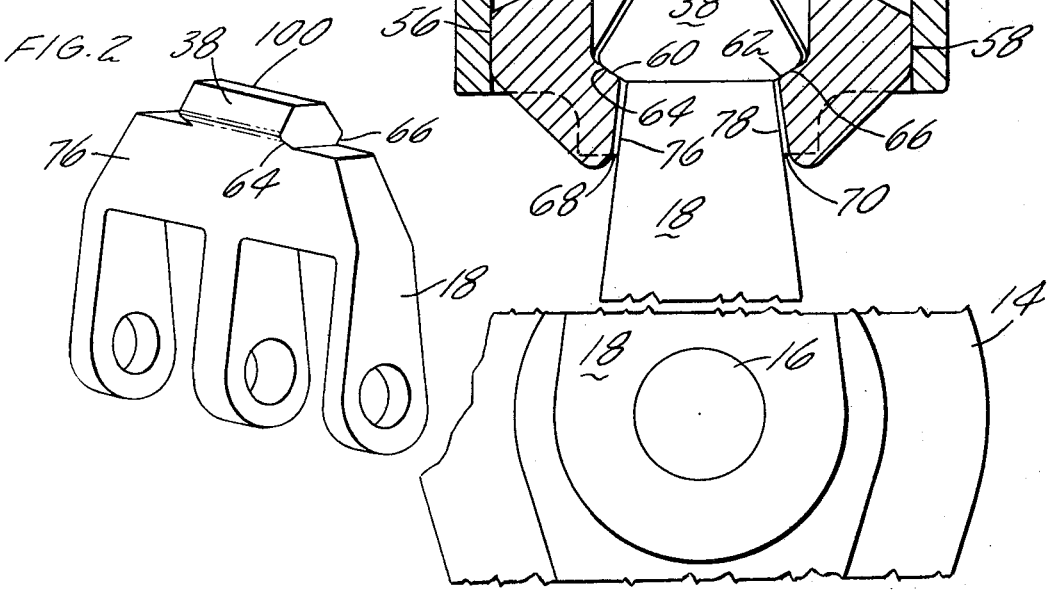

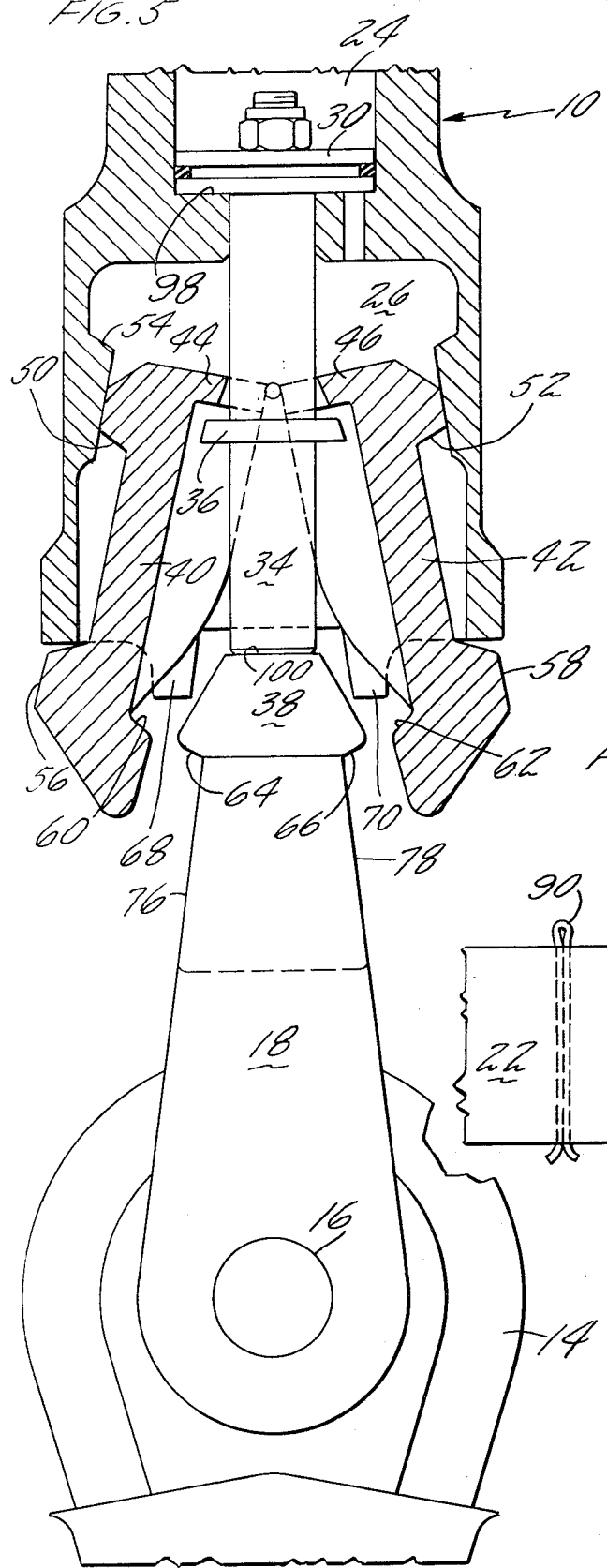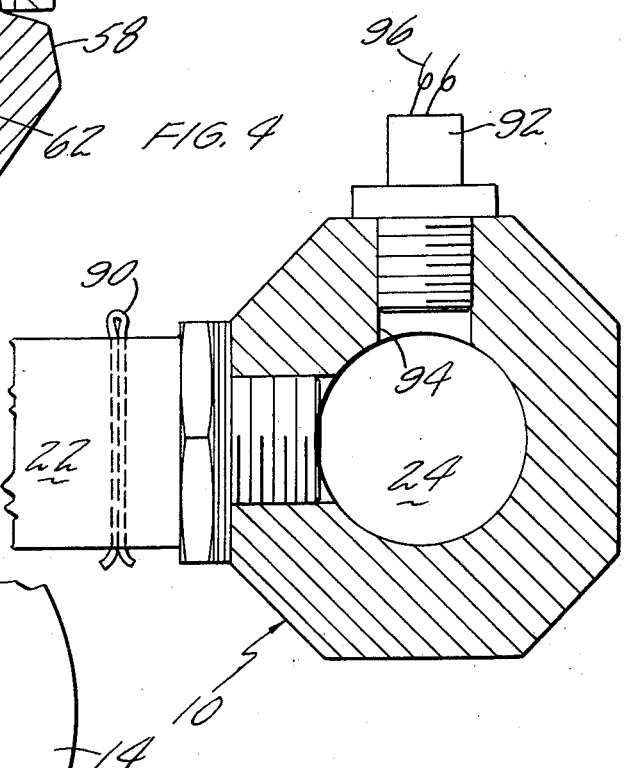

3,810,671

JETTISON DEVICE FOR HELICOPTER LOAD CARRYING SYSTEM

BACKGROUND OF THE INVENTION

1. Field of the Invention

This invention relates to load carrying systems for helicopters and more particularly to a device for jettisoning a load in an emergency situation.

2. Description of the Prior Art

Load carrying systems for aircraft have employed various devices for releasing the load in the event of an emergency including mechanical latches based on toggle action and explosive devices using frangible components. The typical explosive device involves a guillotine which is actuated to sever the cable supporting the load, and the most simple system involves loosely connecting the inner end of a load carrying cable to a take-up drum so that the cable could run off the drum and be dropped along with the load when an emergency arises. An example of the teaching of an explosively actuated shearing device for cutting a line such as a cable is Gross Pat. No. 2,742,697 and an example of a cargo releasing apparatus is Jungersen Pat. No. 3,081,122.

In one load carrying operation a helicopter is equipped for carrying external cargo by suspending a hook some distance below the fuselage on a pendant constructed of nylon or similar textile webbing. Owing to the considerable weight of large capacity hooks it has become necessary to provide an auxiliary hoist cable to lift the hook into a stowed position within the fuselage. In normal operation cargo would be released by opening the hook by remote control, but under some emergency conditions when fast, positive action is necessitated it is desirable to jettison the hook and pendant as well as the cargo. There is a need for a device which will provide a high strength attachment for the pendant and be capable of simple and reliable release, simultaneously cutting the hoist cable.

SUMMARY OF THE INVENTION

An object of the present invention is to provide an improved device for jettisoning the load being carried by a helicopter.

Another object of the invention is to provide a jettisoning device for a helicopter load carring system which has a high strength attachment for a pendant and which is capable of simple and reliable release.

Still another object of the invention is to provide an improved jettison device for a helicopter load carrying system having a pendant suspended hook and an auxiliary hoist cable, the device providing for the simultaneous release of the pendant and cutting the hoist cable in an emergency situation.

In accordance with the present invention, the pressure resulting from the actuation of an explosive device actuates a piston operated releasing rod and collar, the movement of which permits a pair of jaws to pivot and release a load carrying pendant and hook. Simultaneously the pressure generated by the explosive device is utilized to actuate another piston with a cable cutter attached thereto, the movement of which causes the cutter blade to sever a hook retrieval cable. Action of the explosive device is completely confined so that there is no hazard to the helicopter or its crew.

The foregoing and other objects, features and advantages of the invention become more apparent in the light of the following detailed description of a preferred embodiment thereof, as illustrated in the accompanying drawing.

BRIEF DESCRIPTION OF THE DRAWING

FIG. 1 is a sectional view through a jettisoning housing construction in accordance with the invention showing the pendant drop and cable cutting features in locked position.

FIG. 2 is a perspective view of the pendant attachment fitting.

FIG. 3 is a perspective view of the bottom of the jettisoning housing showing the restraining lugs.

FIG. 4 is a partial sectional view along line A—A of FIG. 1 showing the pressure cartridge.

FIG. 5 is a sectional view of the housing of FIG. 1 showing the pendant drop elements in fired position.

DESCRIPTION OF THE PREFERRED EMBODIMENT

Referring to FIG. 1, housing 10 is shown which would be universally pivoted to fixed helicopter structure at its upper end, a portion of the support frame being indicated at 12. Pendant 14 is connected by pin 16 to pendant attachment fitting 18 at the lower end of the housing, the pendant carrying a hook, not shown, at its lower end for attachment to a load. Hoist cable 20 passing through cable guide 22 is connected at one end to a winch in the helicopter fuselage and at its other end to the pendant hook, and is used to raise the relatively heavy hook for storage with the pendant in the fuselage.

Housing 10 contains upper chamber 24 and lower chamber 26, the two chambers being connected by bore 28. The upper chamber contains piston 30 which has piston ring 32 thereon for sealing purposes. Piston rod 34 extends downward from the piston into chamber 26, being guided by bore 28. The piston rod is provided with collar 36 within chamber 26, and the lower end of the piston rod is adjacent but spaced from bulbous end 38 on pendant attachment fitting 18. The bulbous end, as can be seen in FIG. 2, is of a rectangular shape in a horizontal plane for larger loads, but it could be of circular shape for lesser loads where the bearing contact area need is not as great.

Jaws 40 and 42 are positioned in chamber 26 and have flanges 44 and 46, respectively, which are beveled in accordance with bevel 48 on collar 36, and which are in contact with the collar in the operational position shown. Jaws 40 and 42 also have shoulders 50 and 52, respectively, which are beveled in accordance with and contact shoulder 54 around chamber 26. The jaws also have lands 56 and 58 at their lower end which contact the wall of chamber 26 and abutments 60 and 62 which contact shoulders 64 and 66 on opposite sides of the lower portion of bulbous end 38. Lugs 68, 70, 72 and 74, FIGS. 1, 3 and 5, on the bottom of housing 10 are provided to restrain pendant attachment fitting 18 from rotation and possible wear of abutments 60 and 62 and shoulders 64 and 66. Lugs 68 and 72 contact surface 76 on fitting 18, and lugs 70 and 74 contact surface 78 on the fitting and thus secure the relative position of the fitting, jaws and housing.

Piston 30 and its piston rod 34, and jaws 40 and 42, are retained in the position shown by cotter pin 80. When pendant 14 is attached to a load, the weight of the load tends to pull pendant attachment fitting 18 downward. Shoulders 64 and 66 acting on abutments 60 and 62 tend to push jaws 40 and 42 apart, but this movement is resisted by the circumferential wall of chamber 26 and by collar 36 on piston rod 34 which prevents inward movement of jaw flanges 44 and 46. The weight of the load is, therefore, transferred by jaw shoulders 50 and 52 to housing shoulder 54.

Cable guide 22 has chamber 82 defined therein which connects with the upper end of chamber 24 through bore 84. Hoist cable 20 passes through chamber 82 which contains cable cutter piston 86 and striker plug 88, the cutter piston being held in the position shown by cotter pin 90 (FIGS. 1 and 4).

As shown in FIGS. 1 and 4, pressure cartridge 92 is attached to housing 10, and connects with the upper end of chamber 24 by means of bore 94. Electrical connector 96 is provided for actuating the cartridge.

For operation of the jettison device, if emergency release of the cargo becomes necessary, pressure cartridge 92 is actuated by means of electrical connector 96. This creates a high pressure within that portion of upper chamber 24 above piston 30. This pressure will move piston 30 and piston rod 34 downward, shearing cotter pin 80 to release pendant attachment fitting 18, and the pendant, hook and load, and it will move cutter piston 86 to the left towards striker plug 88 shearing cotter pin 90 to sever hoist cable 20.

The release of pendant attachment fitting 18, and the load, after the firing of pressure cartridge 92, is shown in FIG. 5. Pressure in chamber 24 has moved piston 30 and piston rod 34 downward until the lower end of the piston contacted lower end wall 98 of chamber 24. During downward movement of the piston and piston rod, collar 36 on the piston rod was displaced from contact with flanges 44 and 46 on jaws 40 and 42, respectively. The resultant of the load on pendant attachment fitting 18 acting through shoulders 64 and 66 on adjacent abutments 60 and 62 of jaws 40 and 42, respectively, and the action of shoulder 54 on shoulders 50 and 52, forces the top end of the jaws towards each other. Also, as the piston rod continued to move downward, its lower end contacted face 100 on bulbous end 38 of fitting 18 to force the fitting and the lower end of the jaws downward. As the jaws emerge from housing 10, their lower ends may move apart as soon as lands 56 and 58 have cleared the bottom of the housing and the fitting and attached pendant are jettisoned along with the load.

Although the invention has been shown and described with respect to a preferred embodiment thereof, it should be understood by those skilled in the art that the foregoing and other changes and omissions in the form and detail thereof may be made therein without departing from the spirit and scope of the invention, which is to be limited and defined only as set forth in the following claims.

I claim:

1. A jettison device for the load carrying system of a helicopter including;
   load supporting means;
   means suspending said load supporting means from said helicopter;
   means separate from said suspending means for retrieving said load supporting means for storage in said helicopter;
   an explosively operated device;
   and means actuated by said explosively operated device for simultaneously jettisoning said load supporting means and severing said retrieving means.

2. A jettison device for the load carrying system of a helicopter including;
   load supporting means;
   means suspending said load supporting means from said helicopter;
   means separate from said suspending means for retrieving said load supporting means for storage in said helicopter;
   explosively operated means associated with said suspending means;
   means actuated by said explosively operated means for separating said suspending means and said load supporting means;
   and means simultaneously actuated by said explosively operated means for disconnecting said retrieving means from said load supporting means.

3. A jettison device for the load carrying system of a helicopter including;
   load supporting means;
   means for retrieving said load supporting means for storage in said helicopter;
   means connecting said helicopter and said load supporting means;
   said connecting means including housing means having a plurality of chambers therein;
   one of said chambers having piston means therein;
   another of said chambers having means therein for retaining said load supporting means in said housing means;
   another of said chambers having said retrieving means passing therethrough and having means therein for severing said retrieving means;
   means operatively connecting said piston means and said load supporting retaining means;
   and pressure generating means connected to said one of said chambers for simultaneously actuating said piston means and said severing means for releasing said load supporting means from said housing means and severing said retrieving means.

4. A jettison device for the load carrying system of a helicopter including;
   load supporting means;
   means for retrieving said load supporting means for storage in said helicopter;
   means connecting said helicopter and said load supporting means;
   said connecting means including housing means having a plurality of chambers therein;
   one of said chambers having piston means therein,
   another of said chambers having jaw means therein for retaining said load supporting means in said housing;
   means associated with said piston means for retaining said jaw means in a load supporting position in said another chamber;
   still another of said chambers having said retrieving means passing therethrough and having means therein for severing said retrieving means;
   pressure generating means connected to said one of said chambers;
   and means for actuating said pressure generating means to simultaneously cause said jaw means to release said load supporting means and said severing means to sever said retrieving means.

5. A device for jettisoning a load carried by a helicopter, said device including;
- a housing connected to fixed helicopter structure and to a load carrying pendant;
- said pendant having means at one end for attachment to said housing and a cargo hook at its other end;
- said housing having an upper chamber and a lower chamber;
- pressure generating means connected to said upper chamber;
- cable guide means connected to said upper chamber;
- a cable connected at one end to helicopter structure and at its other end to said pendant cargo hook and passing through said cable guide means;
- said cable guide means including means for severing said cable;
- a piston within said upper chamber;
- a piston rod connected to said piston and extending into said lower chamber;
- collar means on a portion of said piston rod within said lower chamber;
- shoulder means on the periphery of said lower chamber; and
- jaw means in said lower chamber;
- said jaw means including;
    1. flange means cooperatively engaging said collar means;
    2. shoulder means cooperatively engaging said lower chamber shoulder means;
    3. land means for engaging the periphery of said lower chamber;
    4. and abutment means for engaging said pendant.

6. A helicopter load jettisoning device in accordance with claim 5 in which the pendant attachment means includes a bulbous end normally aligned longitudinally with said piston rod when connected to said housing;
- said bulbous end and said piston rod being spaced apart longitudinally so that displacement of said piston and piston rod due to actuation of said pressure generating means displaces said collar means from engagement with said jaw flange means before said piston rod contacts said bulbous end.

* * * * *